United States Patent [19]

Lan

[11] Patent Number: 6,028,767
[45] Date of Patent: Feb. 22, 2000

[54] EXTERNALLY CONNECTED EXPANSION DEVICE WITH REPLACEABLE GUIDING FACE PANEL FOR GUIDING DIFFERENT PORTABLE COMPUTERS

[75] Inventor: Chuan-Chi Lan, Taipei, Taiwan

[73] Assignee: Compal Electronics Inc., Taipei, Taiwan

[21] Appl. No.: 09/079,404

[22] Filed: May 15, 1998

[51] Int. Cl.[7] .................................................. G06F 1/16
[52] U.S. Cl. ..................................... 361/686; 361/683
[58] Field of Search ........................... 439/159; 710/62; 361/686

[56] References Cited

U.S. PATENT DOCUMENTS 5,699,226  12/1997  Cavello ............................. 361/686
5,928,017  7/1999  Lan ................................... 361/686

Primary Examiner—Leo P. Picard
Assistant Examiner—Tung Minh Bui
Attorney, Agent, or Firm—Bacon & Thomas

[57] ABSTRACT

An externally connected expansion device with replaceable guiding face panel for guiding different portable computers. The expansion device has a guiding seat body in which the guiding face panel is replaceable in accordance with the height from the bases to the connectors of different portable computers. In addition, two sides of the guiding face panel respectively disposed with a stopper member in accordance with the PCMCIA socket and/or MODEM socket of different models of portable computers so as to seal the socket and achieve a protective effect.

9 Claims, 6 Drawing Sheets

EXTERNALLY CONNECTED EXPANSION DEVICE WITH REPLACEABLE GUIDING FACE PANEL FOR GUIDING DIFFERENT PORTABLE COMPUTERS

BACKGROUND OF THE INVENTION

The present invention relates to an expansion device having a guiding seat body, and more particularly to an externally connected expansion device in which the guiding face Panel of the seat body is replaceable for guiding different portable computers.

It is known that expansion devices such as a docking or replicator are used to expand the function of a portable computer. Generally, in order to smoothly connect the portable computer with the expansion device, a guiding seat body is disposed at front end of the bottom of the expansion device for guiding the portable computer so as to align and electrically connect the connector of the portable computer with the connector of the expansion device.

However, after the guiding seat body is disposed on the expansion device, the guiding seat body is fixed and can be hardly disassembled. Therefore, with respect to different models of portable computers with different heights from the bottom to the connector, the fixed guiding seat body will be unable to apply to these portable computer. At this time, it is necessary to disassemble the guiding seat body and replace the same with another to meet the requirement of different model of portable computer. In the case that no other guiding seat body can be replaced for the original one, a user must detach the original guiding seat body and then cautiously directly connect the portable computer with the expansion device. This is quite inconvenient to the user.

Furthermore, different models of portable computers will have different protection designs for the connector. Some employ manual pull doors to expose the connector, while some employ upper and lower pivotal door boards. A dent is formed at the adjoining portion of the door boards for a conic body to abut against the dent so as to stretch open the door boards to expose the connector. In general, the conic body is fixedly disposed on the expansion device and cannot be applied to the portable computer with manual pull doors. In addition, the guiding seat body of the conventional device is not equipped with protection for protecting the expansion socket of the portable computer such as PCMCIA socket and MODEM socket.

SUMMARY OF THE INVENTION

It is a primary object of the present invention to provide an externally connected expansion device with replaceable guiding face panel for guiding different portable computers. It is unnecessary to replace or discard the entire guiding seat body. Instead, different guiding face panels are easily replaceably assembled with the guiding seat body so as to meet different heights of different models of portable computers from the bottom to the connector.

It is a further object of the present invention to provide the above externally connected expansion device with replaceable guiding face panel, in which the connector of the expansion device can be connected to the connectors of portable computers with manual pull doors or upper and lower protective door boards.

It is still a further object of the present invention to provide the above externally connected expansion device with replaceable guiding face panel, in which the guiding face panel is disposed with a stopper member in accordance with the PCMCIA socket and/or MODEM socket of different models of portable computers so as to seal the socket and achieve a protective effect.

According to the above objects, the externally connected expansion device with replaceable guiding face panel of the present invention includes: a housing at least having a top face, a front face and a base seat, a circuit board being disposed in the housing, the circuit board being disposed with a connector extending out of the front face of the housing; a seat body disposed at front end of the base seat, two sides of the rear end of top face of the seat body being respectively disposed with an insertion slot section near the base seat, a front end thereof being disposed with a receiving frame in which a shoulder section is formed to define a first opening, front ends of two sides of the receiving frame being respectively formed with two second openings, the rear ends of two sides of the seat body being respectively disposed with a hanging hook extending downward and rearward; a slide block placed into the receiving frame to slide back and forth therewithin, a bottom face of the slide block being formed with a thread hole; and a board body disposed with thread hole corresponding to the thread hole of the slide block, the fronts end of two sides of top face thereof being respectively disposed with a projecting block corresponding to the second openings, the rear ends of two sides of the board body being respectively disposed with two hanging hooks extending downward and forward, whereby a bolt is passed through the thread hole of the board body and the first opening of the seat body to be tightened in the thread hole of the slide block, at this time, the projecting blocks of the board body being respectively upward passed through the second openings of the seat body, then each hanging hook of the board body being hooked with a spring extending to the hanging hook of bottom face of the bottom face of the seat body.

The externally connected expansion device with replaceable guiding face panel further includes over one different guiding face panel. Each guiding face panel has an opening corresponding to the first opening of the seat body. Two sides thereof are respectively disposed with a support arm. A rear end of each support arm is disposed with a projecting plate corresponding to the insertion slot of the seat body. The front ends of two sides of the bottom thereof are disposed with projecting blocks corresponding to the second opening. When assembling the guiding face panel, the projecting plate is inserted into the insertion slot of the seat body and the projecting blocks of the guiding face panel are aligned with the second opening of the seat body to force the projecting blocks of the board body to resist against the pulling force of the resilient member and slide forward until the projecting blocks of the guiding face panel are totally sunk into the second opening of the seat body and the projecting blocks of the board body are tightened by the restoring force of the resilient member.

The externally connected expansion device with replaceable guiding face panel further including a resilient conic pushing member disposed in the housing and extending out of the front face thereof for stretching open upper and lower pivotal protective door boards of the connector of a portable computer. The resilient conic pushing member is also applicable to the portable computer in which the connector has manual pull doors.

The present invention can be best understood through the following description and accompanying drawings, wherein:

DETAILED DESCRIPTION OF THE PREFERRED EMBODIMENTS

Figure 1:
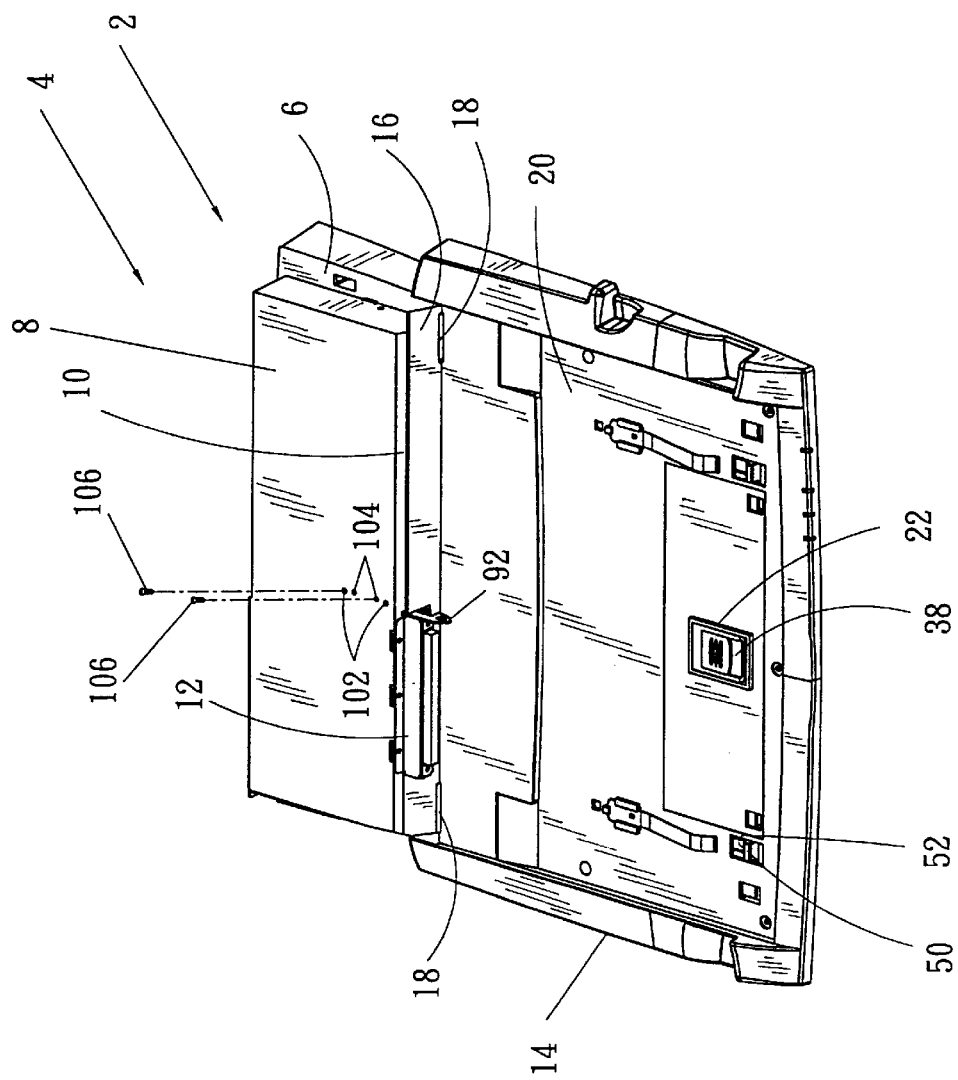
FIG. 1 is a perspective view of the externally connected expansion device with replaceable guiding face panel for guiding different portable computers of the present invention.

Please refer to FIG. 1. The present invention includes an expansion device 2 having a housing 4 and a base seat 6. The housing 4 at least includes a top face 8 and a front face 10. A circuit board (not shown) is enclosed in the housing 4 and the base seat 6. A connector 12 extends out of the front face 10 of the housing 4. The feature of the present invention resides in that the base seat 6 of the expansion device 2 has a forward extending seat body 14. In this embodiment, the seat body 14 is integrally molded with the base seat 6. The seat body 14 is disposed with a partitioning board 16 at rear end of top face adjacent to the base seat 6. Two sides of the bottom of the partitioning board 16 are respectively formed with slots 18. In addition, the front end of top face of the seat body 14 is formed with a recess 20.

Figures 2A, 2B:
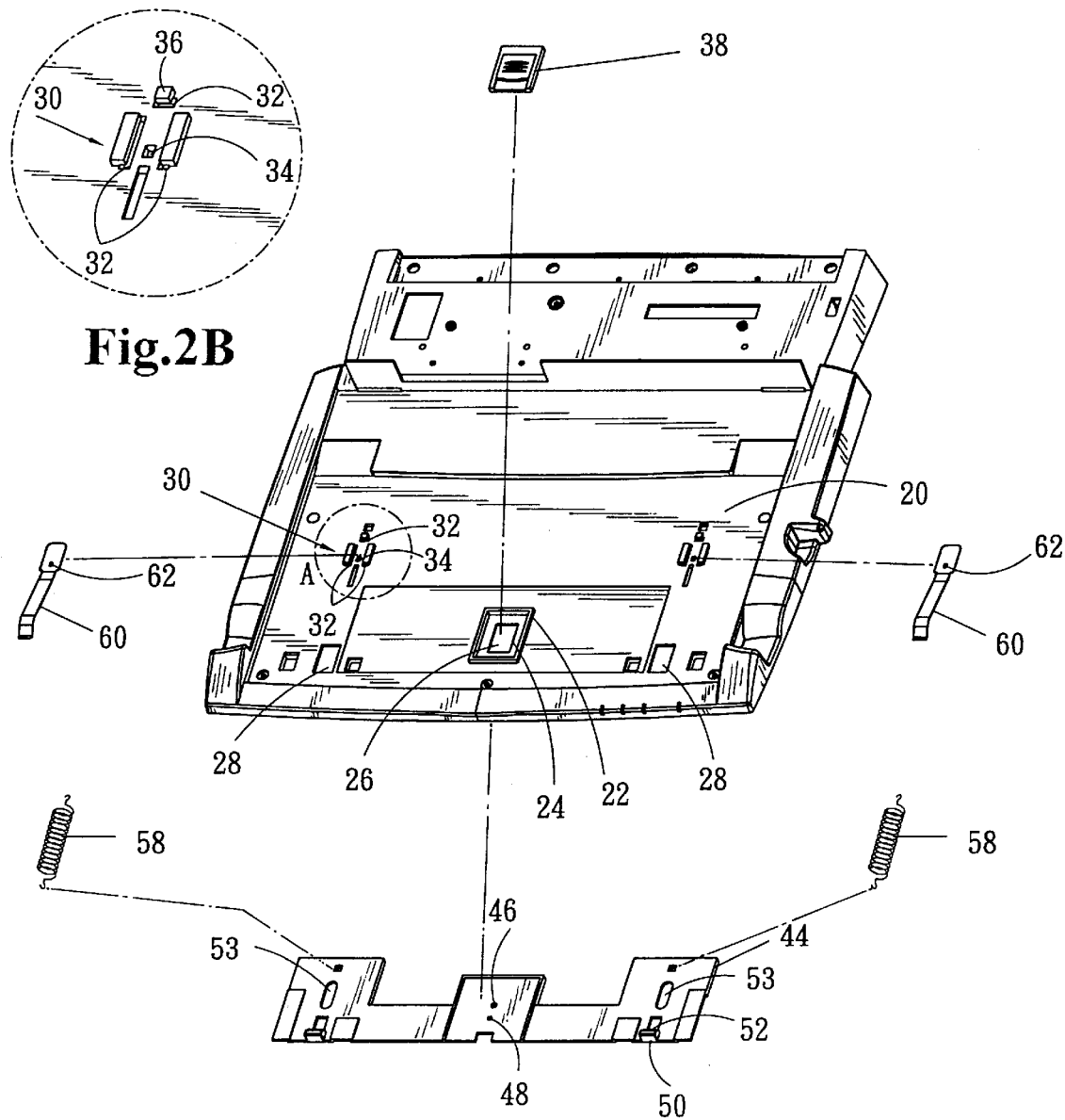
FIGS. 2A and 2B are top perspective exploded views of the recessed section of FIG. 1.
Figure 3:
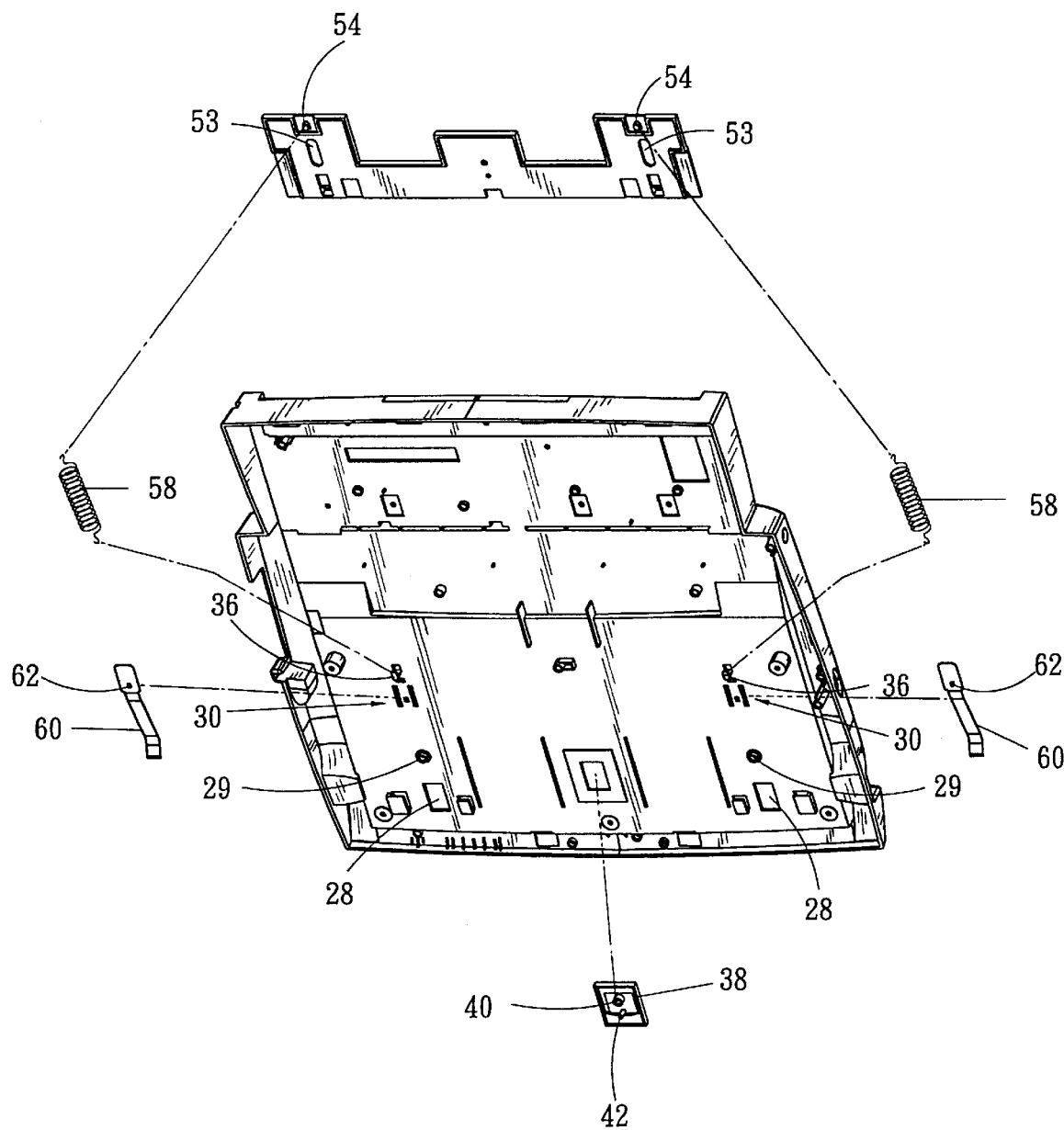
FIG. 3 is a bottom perspective exploded view of the recessed section of FIG. 1.

Please refer to FIGS. 2A and 2B. The center of front end of top face of the recessed section 20 is disposed with a rectangular receiving frame 22. In the receiving frame 22 is formed a shoulder section 24 defining a first rectangular opening 26. In addition, front ends of two sides of the receiving frame 22 are respectively formed with two second rectangular openings 28. The rear ends of two sides of the receiving frame 22 are respectively disposed with two substantially U-shaped leaf spring supports 30 each having an opening facing forward. The inner edge of the support is formed with a slide channel 32. The front end face in the support 30 is formed with a dent 34. In addition, as shown in FIG. 3, a downward rearward extending hanging hook 36 is disposed on the bottom face of the recessed section 20 opposite to the rear end of the support 30. A slide block 38 is placed into the receiving frame 22 to slide back and forth therewithin. The bottom face of the slide block 38 is formed with a locating socket 40 and a thread hole 42 (as shown in FIG. 3) A board body 44 is installed on bottom face of the recessed section 20. The center of the board body 44 is disposed with locating projection 46 and thread hole 48 corresponding to the slide block locating socket 40 and thread hole 42. The fronts end of two sides are respectively disposed with projecting blocks 50 corresponding to the second rectangular openings 28. The rear end face of the projecting block 50 is formed wit a slope face 52 inclined from front upper side to rear lower side. The rear ends of two sides of the board body 44 are respectively disposed with two hanging hooks 54 extending downward and forward (as shown in FIG. 3).

Therefore, when installed, the locating projection 46 of the board body through the first rectangular opening 26 is inserted in the locating socket 40 of the slide block. Then a bolt 56 is passed through the opening 26 and tightened in the thread holes 42, 48. At this time, the projecting blocks 50 of the board body 44 are respectively upward passed through the second rectangular openings 28. Then each hanging hook 54 of the board body 44 is hooked with a spring 58 extending to the hanging hook 36 of bottom face of the recessed section 20 to complete the installation as shown in FIG. 1. The springs 58 pull the slide block 38 and the projecting blocks 50 of the board body to slide rearward until the slide block 38 abuts against the rear edge of the receiving frame 22.

In order to synchronously move two sides of the board body 44 back and forth, an elongated passage 53 is disposed between the projecting blocks 50 and the hanging hooks 54. A locating bolt 29 is disposed between the second rectangular opening 28 of bottom face of the recessed section 20 and the leaf spring support 30. After installed as shown in FIG. 1, the locating bolt 29 is positioned in the passage 53, whereby two sides of the board body 44 can be stably moved back and forth at the same time.

In addition, the openings of two arch leaf springs 60 face downward. One end of which is along slide channel 32 inserted in the support 30 of FIG. 2. The bottom face of the end is disposed with a downward extending ratchet 62 engaged with the dent 34 of the support 30 so as to fix the leaf spring 60 without sliding.

Figure 4:
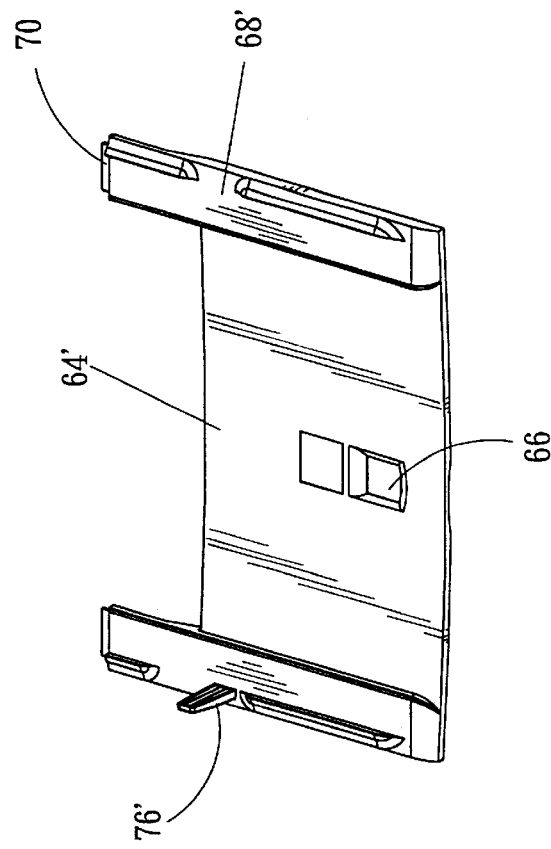
FIGS. 4 to 6 are perspective views respectively showing three kinds of guiding face panels of the present invention.
Figure 5:
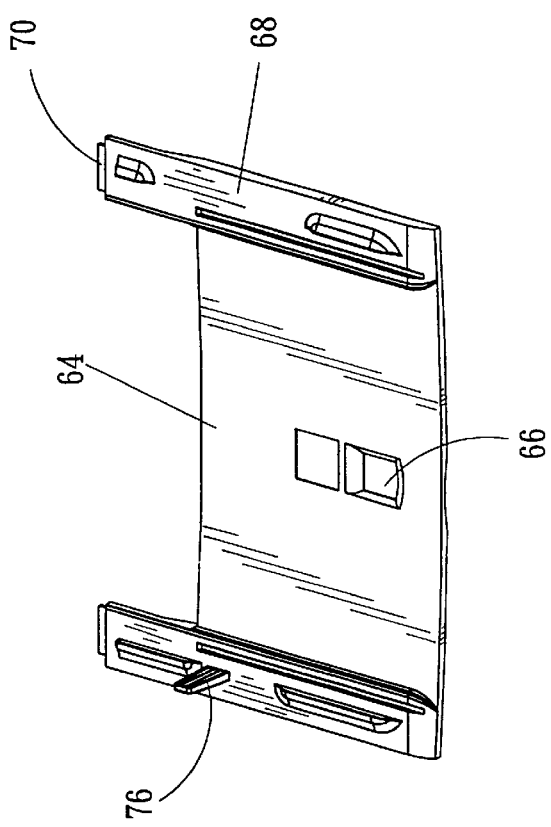
Figure 7:
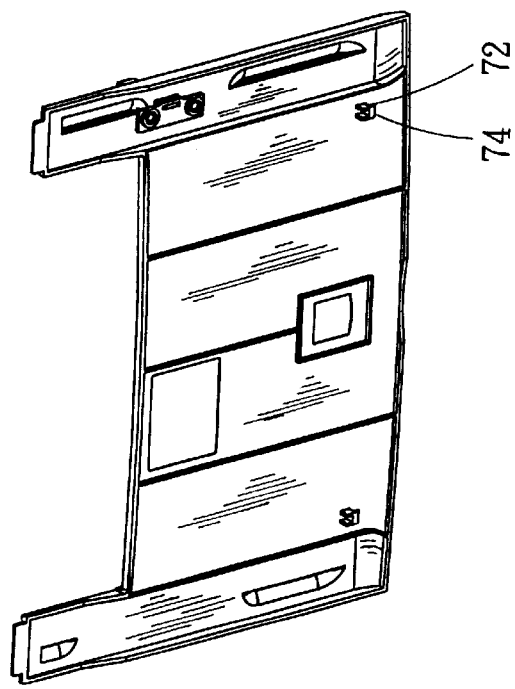
FIG. 7 is a bottom view according to FIG. 4.
Figure 6:
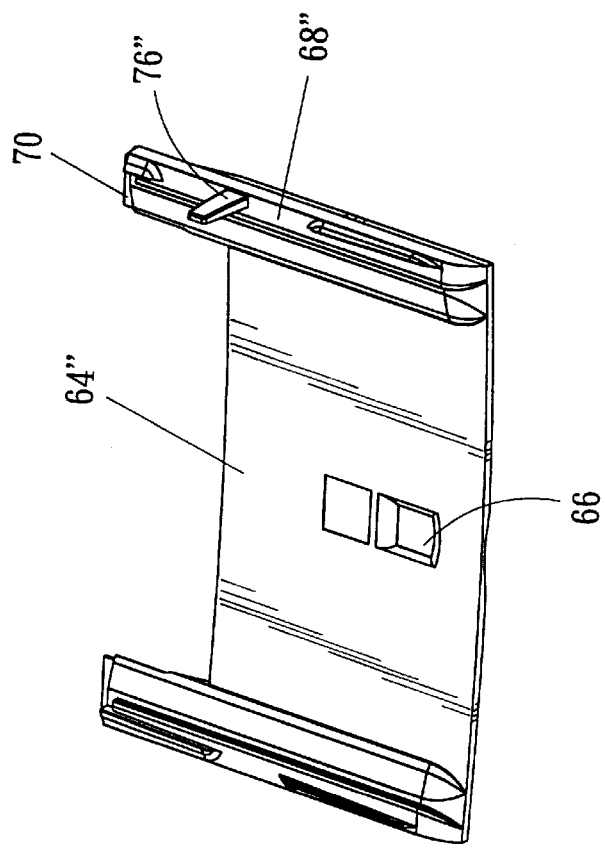

FIGS. 4 to 6 show three kinds of different guiding face panels 64, 64', 64". FIG. 7 is a bottom view according to FIG. 4. Each guiding face panel corresponds to the recessed section 20. The front end of the center thereof is formed with an opening 66 corresponding to the first rectangular opening 26 of the recessed section. Two sides thereof are respectively disposed with a rearward extending support arm 68, 68', 68". The end portion of the extension is disposed with a projecting plate 70 corresponding to the slot 18 of the partitioning board 16 of FIG. 1. The front ends of two sides of the bottom thereof are disposed with projecting blocks 72 (as shown in FIG. 7) corresponding to the second rectangular opening 28. The front end face of the projecting block 72 is formed with a slope face 74 inclined from front upper side to rear lower side. When assembling the guiding face panels 64, 64', 64", the projecting plates 70 are inserted into the slots 18 and pressed downward to align the slope face 74 (as shown in FIG. 7) with the second rectangular opening 28 to abut against the slope face 52 of the board body of FIG. 1 to achieve a guiding effect and force the projecting block 50 of the board body to slide forward against the pulling force of the spring 58. The projecting block 72 of the guiding face panel resists against the upward restoring force of the leaf spring 60 until the projecting block 72 is totally sunk into the second rectangular opening 28. The projecting block 50 of the board body is tightened by the restoring force of the spring 58.

When replacing the guiding face panel, the slide block 28 is pushed forward, whereby the projecting block 50 of the board body no more tightens the projecting block 72 of the guiding face panel. At this time, the guiding face panel is bounded upward by the upward restoring force oof the leaf spring 60. A user can then conveniently forward draw out the guiding face panel to separate the projecting plate 70 thereof from the slot 18 of the partitioning board 16. Then another guiding face panel can be assembled in the manner as described above. Moreover, as shown in FIGS. 4 to 6, the guiding face panels 64, 64', 64" are different from each other in the support arms 68, 68', 68" which can be changed in accordance with the height from the bases to the connectors of different portable computers.

The guiding face panels 64, 64', 64" can be modified to an entire face panel including two support arms 68, 68', 68" to directly cover the seat body 14, whereby the front end of top face of the seat body 14 is no more necessary to form a recessed section 20 thereon.

In addition, the support arm 68, 68', 68" can be disposed with a stopper member 76, 76' or 76" in accordance with the PCMCIA socket and/or MODEM socket (not shown) of different models of portable computers so as to seal the socket and achieve a protective effect.

Figure 8:
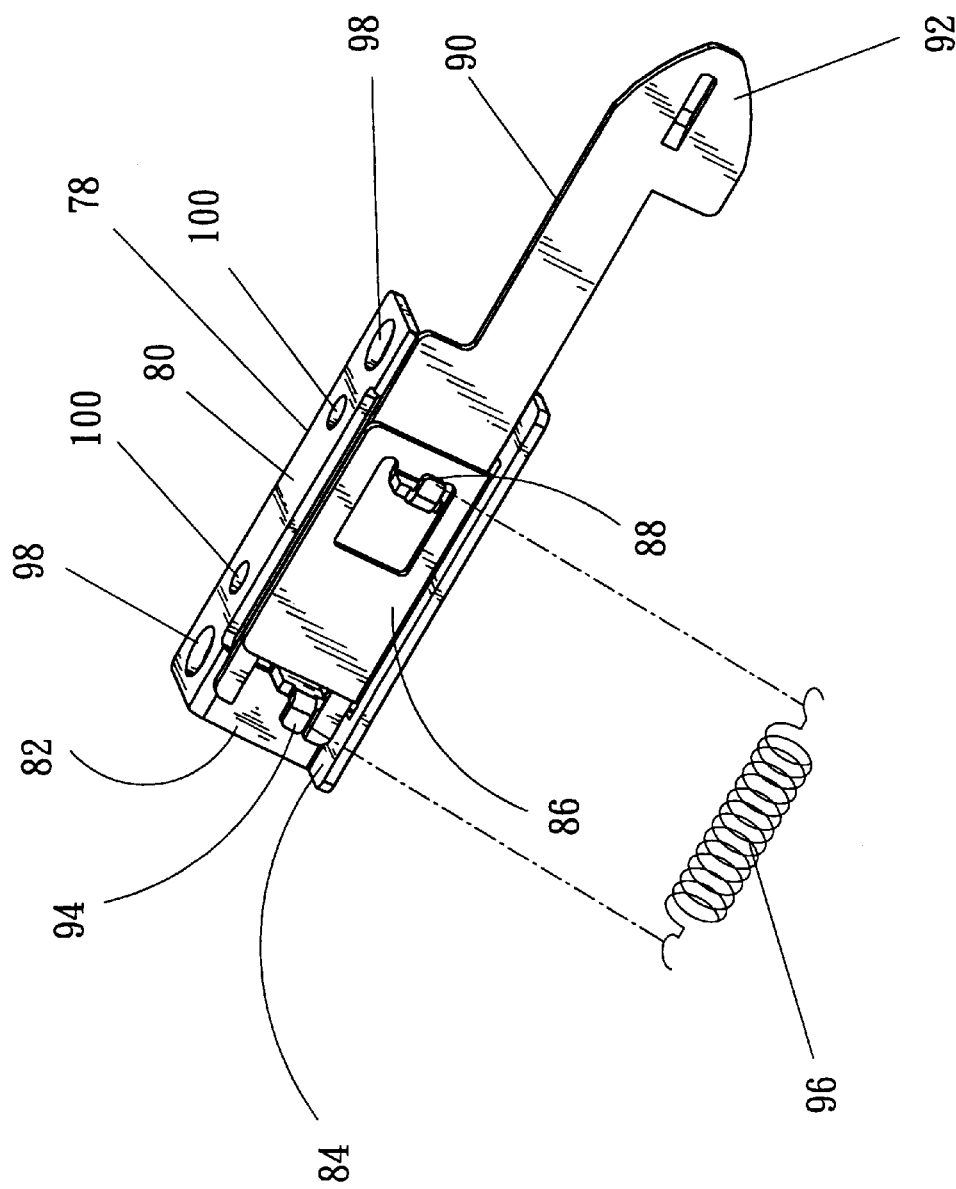
FIG. 8 is a perspective view of the resilient conic pushing member of the present invention.

Also, in order to be applicable to both the connectors of the expansion device of different models of portable computers, which are disposed with manual pull door or upper and lower door board protection, the conventional conic pushing member is improved to a resilient conic pushing member. FIG. 8 shows the conic pushing member of the present invention, including a support frame 78, a top board 80 having a substantially Z-shaped pattern, a first upright board 82 and a base board 84. The top face of the base board 84 has an upward extending second upright board 86 spaced from the first upright board 82. The left face of the second upright board 86 is disposed with a hanging hook 88 extending to left front side. An elongated strip board 90 is bridged over the gap between the first and second upright boards 82, 86. The front end 92 thereof is formed with a conic shape. The rear end thereof has a hanging hook 94 extending to left rear side. A spring 96 is hung between the hanging hooks 88, 94. The top face of the top board 80 is disposed with locating socket 98 and thread hole 100. Referring back to FIG. 1, the top face 8 of the expansion device 2 is disposed with a downward projection 102 and thread hole 104. The projection 102 is fitted into the locating socket 98 to achieve a locating effect. Bolts 106 are screwed and tightened in the thread holes 100, 104. BY means of the resilient force of the spring 96, the conic front end 92 of the conic pushing member will be retracted by resistance force. Therefore, it not only serves to stretch open the upper and lower pivotal door boards, but also is applicable to manual pull door board.

It should be noted that the above description and accompanying drawings are only used to illustrate some embodiments of the present invention, not intended to limit the scope thereof. Any modification of the embodiments should fall within the scope of the present invention.

What is claimed is:

1. An externally connected expansion device with replaceable guiding face panel for guiding different portable computers, comprising:

a housing at least having a top face, a front face and a base seat, a circuit board being disposed in the housing, the circuit board being disposed with a connector extending out of the front face of the housing;

a seat body disposed at front end of the base seat, two sides of the rear end of top face of the seat body being respectively disposed with an insertion slot section near the base seat, a front end thereof being disposed with a receiving frame in which a shoulder section is formed to define a first opening, front ends of two sides of the receiving frame being respectively formed with two second openings, the rear ends of two sides of the seat body being respectively disposed with a hanging hook extending downward and rearward;

a slide block placed into the receiving frame to slide back and forth therewithin, a bottom face of the slide block being formed with a thread hole; and a board body disposed with thread hole corresponding to the thread hole of the slide block, the fronts end of two sides of top face thereof being respectively disposed with a projecting block corresponding to the second openings, the rear ends of two sides of the board body being respectively disposed with two hanging hooks extending downward and forward, whereby a bolt is passed through the thread hole of the board body and the first opening of the seat body to be tightened in the thread hole of the slide block, at this time, the projecting blocks of the board body being respectively upward passed through the second openings of the seat body, then each hanging hook of the board body being hooked with a spring extending to the hanging hook of bottom face of the bottom face of the seat body.

2. An externally connected expansion device with replaceable guiding face panel as claimed in claim 1, further comprising over one different guiding face panel, each guiding face panel having an opening corresponding to the first opening of the seat body, two sides thereof being respectively disposed with a support arm, a rear end of each support arm being disposed with a projecting plate corresponding to the insertion slot of the seat body, the front ends of two sides of the bottom thereof being disposed with projecting blocks corresponding to the second opening, whereby when assembling the guiding face panel, the projecting plate is inserted into the insertion slot of the seat body and the projecting blocks of the guiding face panel are aligned with the second opening of the seat body to force the projecting blocks of the board body to resist against the pulling force of the resilient member and slide forward until the projecting blocks of the guiding face panel are totally sunk into the second opening of the seat body and the projecting blocks of the board body are tightened by the restoring force of the resilient member.

3. An externally connected expansion device with replaceable guiding face panel as claimed in claim 2, wherein the support arms can be changed in accordance with the height from the bases to the connectors of different portable computers.

4. An externally connected expansion device with replaceable guiding face panel as claimed in claim 2, wherein the support arm can be disposed with a stopper member in accordance with the PCMCIA socket and/or MODEM socket of different models of portable computers so as to seal the socket and achieve a protective effect.

5. An externally connected expansion device with replaceable guiding face panel as claimed in claim 2, wherein the rear end face of the projecting block of the board body and the front end facce of the projecting block of the guiding face panel are both formed with slope faces inclined from front upper side to rear lower side.

6. An externally connected expansion device with replaceable guiding face panel as claimed in claim 1, wherein the seat body and the base seat are integrally formed.

7. An externally connected expansion device with replaceable guiding face panel as claimed in claim 1, wherein the rear ends of two sides of the receiving frame are respectively disposed with a leaf spring support for supporting an arch leaf spring having an opening facing the top face of the seat body.

8. An externally connected expansion device with replaceable guiding face panel as claimed in claim 7, wherein the leaf spring support is substantially U-shaped, having an opening facing forward, each inner edge of the support being formed with a slide channel, the front end face in the support being formed with a dent, one end of the arch leaf spring being along the slide channel inserted in the support, the bottom face of the end being disposed with a downward extending ratchet engaged with the dent of the support so as to fix the leaf spring without sliding.

9. An externally connected expansion device with replaceable guiding face panel as claimed in claim 1, further comprising a resilient conic pushing member disposed in the housing and extending out of the front face thereof for stretching open upper and lower pivotal protective door boards of the connector of a portable computer.

\* \* \* \* \*